Oct. 22, 1957     H. S. COOPER     2,810,635
PROCESS FOR MAKING ALKALI METALS AND APPARATUS THEREFOR
Filed July 12, 1955
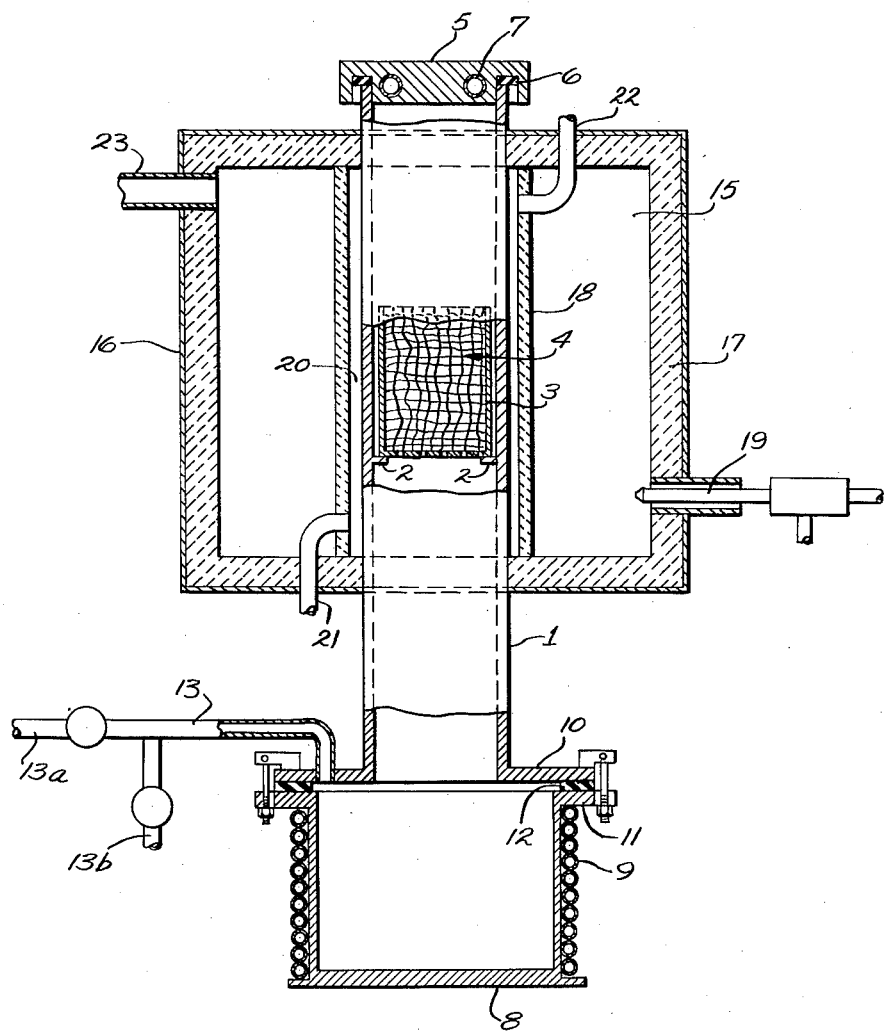
INVENTOR.
HUGH S. COOPER
BY
Evans & Pearne
ATTORNEYS United States Patent Office 2,810,635
Patented Oct. 22, 1957

2,810,635
PROCESS FOR MAKING ALKALI METALS AND APPARATUS THEREFOR

Hugh S. Cooper, Shaker Heights, Ohio

Application July 12, 1955, Serial No. 521,581

9 Claims. (Cl. 75—66)

This invention relates to a novel process for the separation of elemental alkali metals from certain compounds thereof, and to a novel apparatus for carrying out such process.

The alkali metals, i. e., sodium, lithium, potassium, cesium, and rubidium, can be made either by electrolysis of their fused chlorides or by thermochemical reactions. Currently, sodium and lithium are commercially produced from their chlorides by electro deposition. Potassium is produced by the reaction between metallic sodium and potassium chloride. Of the alkali metals, sodium is by far of greatest importance, having an annual production of about 250,000,000 lbs. The annual production of lithium is about 100,000 lbs., potassium somewhat less, and cesium and rubidium are produced in very small amounts.

A number of methods other than fused salt electrolysis have been proposed from time to time for making sodium and potassium. For example, it has been proposed to use calcium carbide as a reducing agent for the halides and sulphides of sodium and potassium. In still another process, it was proposed to reduce sodium silicate with ferro silicon. However, none of these other methods has ever attained industrial importance. This is probably becaues of higher costs as compared with electrolytic processes.

It has now been found that the alkali metals, and particularly sodium, lithium and potassium, can be made in accordance with the present invention simply and economically by reduction of the respective aluminates with aluminum metal. In addition to the alkali metal produced by the reaction, aluminum oxide is made and can be used over again to make more aluminate. The aluminates are readily made from the carbonates of the respective metals by heating a carbonate-alumina mixture.

It is a principal object of this invention, therefore, to provide a novel, simple, and economical process and apparatus for the production of alkali metals by reduction of their respective aluminates with aluminum metal.

Another object of this invention is to provide a novel process for the production of alkali metals in which the alumina by-product of the reaction may be re-circulated in the process, thereby improving the economy of the process.

Other objects of this invention will appear as the description proceeds.

Broadly stated, this invention comprises a process for the production of an alkali metal characterized by heating, at a reaction temperature above the melting point of aluminum but below the boiling point thereof, a mixture of an aluminuate of the alkali metal with metallic aluminum.

More particularly, the process of this invention comprises the steps of first reacting an alkali metal carbonate with alumina to obtain the corresponding alkali metal aluminate; next preparing an intimate mixture of finely divided alkali metal aluminate and finely divided aluminum metal, the mixture preferably being briquetted; next heating said mixture in a vacuum to a temperature between the melting point and the boiling point of aluminum to produce molten alkali metal and recovering the alkali metal; and preferably, utilizing at least a portion of the alumina produced as a by-product for the production of additional alkali metal aluminate by reaction with the corresponding alkali metal carbonate.

The invention also comprises novel apparatus characterized by a can having a perforated bottom in which the mixture of alkali metal aluminate and aluminum is heated in the reaction chamber, the can being supported within and intermediate the ends of a vertical tube of heat resistant metal or the like, forming a closed reaction chamber, preferably with clearance between the walls of the can and the surrounding walls of the tube; a product-receiving chamber in air tight communication with the lower end of the tube; means for heating the reaction mixture in the can disposed in the tube; and means for cooling the product-receiving chamber therebelow.

While this novel apparatus is presently preferred for carrying out the process of the invention, it will be appreciated that the process of the invention may be performed in various forms of apparatus. It will also be appreciated that the details of the specific apparatus shown and described herein for illustrative purposes, may be varied considerably while utilizing the principles of the apparatus invention as disclosed herein.

The foregoing objects, advantages, and characteristic features of the invention will be better understood from the following more detailed description thereof, with reference to the accompanying drawing which shows, in diagrammatic form, a vertical cross-section of preferred apparatus for carrying out the process of the invention.

Referring to the drawing, the preferred apparatus may comprise a vertically disposed, tubular, reaction chamber 1, which may suitably be made of nickel for good heat conductivity, resistance to high temperature, and inertness with respect to the reaction materials and products to be contained thereby. Intermediate the ends of the tube is mounted a platform 2, which may simply consist of an inwardly directed annular flange of similar material. If the exterior of the tube 1 is protected against oxidation by a non-oxidizing atmosphere, as hereinafter described, it may be made of steel or other structural metal of suitable strength and heat resistance.

A container 3, in the form of an open top can having perforations in the bottom and preferably, also, in at least the lower side walls thereof, rests upon the platform 2. Though not absolutely essential, the side walls of the can are preferably spaced from the inner surface of the tube 1. The container 3 holds the reaction mixture of alkali metal aluminate and metallic aluminum. Though the container 3 is preferably made of nickel, "Armco" iron or any of various relatively inert, heat resistant materials may be used.

The upper extremity of the reactor tube 1 is provided with a cap 5 of any suitable structure for maintaining a gas-tight seal. In the embodiment shown there is provided a gasket 6 and water cooling means 7 for sealing said cap 5 and cooling it.

A metal product receiver 8, which may be made of steel and is provided with any suitable cooling means, such as water coils 9, is attached to the lower end of the reactor tube 1. The connection should be gas tight and quickly removable, and, to this end, the reactor tube may be provided with a flange 10 adapted to be clamped to a flange 11 on the receiver with an intervening gasket 12.

Suitable means for sequentially evacuating the system and introducing an inert gas, are provided. This may comprise a conduit 13 leading at one end into the system through the flange 10 of the reactor tube and connected at its opposite end to valved conduits 13a and 13b for respectively drawing a vacuum and introducing an inert gas.

Suitable means for heating the reaction tube 1 are provided, which may comprise a heating chamber 15 defined by a steel shell 16 and a refractory liner 17, e. g., firebrick. Inside the chamber 15 and surrounding the reactor tube 1 is a relatively thin refractory sleeve 18 of Carborundum, magnesia, Alundum, or the like. This sleeve 18 protects the reactor tube from direct contact with oxidizing gases from one or more gas burners 19, which may be used to heat the reactor tube and its contents, without substantially impeding heat transmission to the reactor tube. To further minimize oxidation of the exterior of the reactor tube 1, if it be of steel or a ferrous alloy, an inert or reducing gas, such as argon, helium, or hydrogen is introduced into the surrounding space 20 through one of the conduits 21 and 22 while exhausting air from the other of these conduits and such non-oxidizing atmosphere is maintained in the space 20 throughout the use of the apparatus.

The heating chamber 15 may be fired conveniently with a gas-air mixture, the spent gases exhausting through a flue 23. Any other suitable means, e. g., Globar heaters, induction coils, etc., may be used to supply heat to the reactor and to the reaction mass therein.

As indicated above, the alkali metal aluminates are conveniently produced by merely heating the carbonates of the corresponding alkali metals with alumina ($Al_2O_3$) to a reaction temperature of about 800° to 1000° C. to yield the alkali metal aluminate and carbon dioxide. The reaction temperature will depend upon the particular alkali metal carbonate involved and is preferably maintained no higher than necessary to drive the reaction substantially to completion without substantial loss of alkali metal by volatilization. Any convenient source of the alkali metal aluminate may be used, though it is particularly advantageous to produce the aluminate from the corresponding barbonate by reaction with alumina produced in the process as a by-product. The following formulae are indicative of the conversion of the carbonates of sodium, lithium, and potassium to the aluminates by reaction with alumina;

(a) $Na_2CO_3 + Al_2O_3 \rightarrow Na_2Al_2O_4 + CO_2$
(b) $Li_2CO_3 + Al_2O_3 \rightarrow Li_2Al_2O_4 + CO_2$
(c) $K_2CO_3 + Al_2O_3 \rightarrow K_2Al_2O_4 + CO_2$ The reduction of the aluminates thus obtained with aluminum metal can be expressed as follows:

(d) $3Na_2Al_2O_4 + 2Al \rightarrow 4Al_2O_3 + 6Na$
(e) $3Li_2Al_2O_4 + 2Al \rightarrow 4Al_2O_3 + 6Li$
(f) $3K_2Al_2O_4 + 2Al \rightarrow 4Al_2O_3 + 6K$ In the above reactions d, e, and f, the use of pure aluminum metals is preferred, but aluminum scrap or alloys having a low content of volatile metals, such as zinc and magnesium, may be used.

From the foregoing equations it is clear that about 54 lbs. of aluminum will yield about 138 lbs. of sodium; 42 lbs. of lithium; or 234 lbs. of potassium. The alumina thus produced can be heated again with more carbonate to yield the aluminates required for further reductions to alkali metal.

In operating the process, the alkali metal aluminate in powder form is thoroughly pre-mixed in a ball mill or other attrition mill with a powdered, granulated, or other finely divided form of metallic aluminum. This mixture may be reacted as a powder, but is preferably briquetted and charged into the reaction container 3. When the charged container 3 has been placed in the reactor 1 as shown, the system is evacuated to protect the alkali metal product from oxidation during its formation, collection, and cooling. The container 3 and its contents are then heated in a furnace, preferably of the type shown, to a reaction temperature above the melting point of the aluminum metal, but below the boiling point thereof. Aluminum melts at about 660° C. and boils at about 1800° C. For most purposes, the reaction temperature may be between about 800° C. and about 1150° C. Higher or lower temperatures than these will affect the rate of production of the alkali metal.

Within the temperature range indicated, the reaction mixture produces the alkali metals according to the reactions described above. Depending upon the temperature maintained in the reaction zone and the particular alkali metal involved, some or a major part of the alkali metal may be vaporized, but is at least well above its melting point. Liquid alkali metal produced by the reaction may drain downwardly through the perforations in the can 3, and vaporized alkali metal may drift upwardly and down around the outside of the can 3 during the reaction. At the conclusion of the reaction, the heat may be turned off, but the reactor tube is preferably held substantially in the reaction temperature range to conserve heat, being allowed to cool only sufficiently to insure that all alkali metal vapor condenses to a liquid and drains downwardly around and through the can 3 into the receiver 8.

Liquid alkali metal draining directly, or condensing and draining into the receiver 8 may either be cooled as it collects or be cooled at the end of the reaction, to solidify it. When collection and solidification are complete, an inert gas is bled into the system from the conduit 13b, and the receiver 8 is withdrawn for recovery of the product therefrom and quickly replaced with another similar receiver to avoid unnecessary loss of heat from the reactor tube. Then, or at the same time, the tube cover 5 is removed, the can 3 is withdrawn for recovery of the alumina by-product therefrom, another can 3 containing a fresh charge of the reaction mixture is quickly inserted, and the cover 5 is replaced. The system is then evacuated while bringing the temperature back up to the desired range, thus beginning a new cycle of operation after only a brief interruption and small drop in the furnace temperature.

The recovery of the respective metals from the aluminate compound ranges from about 70% in the case of potassium to well above 80% for sodium and lithium, and the products are of a high purity, being better than 99% where the reactants are free from volatile metals such as zinc and magnesium.

As will be apparent to those skilled in the art, other modes of applying the principles of this invention may be employed instead of those specifically set forth above, changes being made as regards the details herein disclosed, provided the elements set forth in any of the following claims, or the equivalent of such be employed.

Having described my invention, I claim:

1. A process for the production of an alkali metal which comprises heating, at a temperature above the melting point of aluminum but below the boiling point thereof, a mixture of an alkali metal aluminate with metallic aluminum.

2. A process in accordance with claim 1 in which the temperature is between about 800° C. and 1150° C.

3. A process for the production of an alkali metal which comprises heating, at a temperature above the melting point of aluminum but below the boiling point thereof and in a vacuum, a mixture of an alkali metal aluminate with metallic aluminum.

4. A process for the production of an alkali metal which comprises heating, at a temperature above the melting point of aluminum but below the boiling point thereof and in a vacuum, an intimate mixture of finely divided alkali metal aluminate and finely divided aluminum.

5. A process for the production of an alkali metal which comprises the steps of first heating a dry alkali metal carbonate with dry alumina to obtain the corresponding alkali metal aluminate, preparing an intimate mixture of the alkali metal aluminate and finely divided aluminum metal, heating said mixture in a vacuum to a reaction temperature between the melting point and the boiling point of aluminum to produce the alkali metal and also to produce alumina as a by-product, recovering the alkali metal, and recovering at least a portion of the alumina and returning it to the process for production of additional alkali metal aluminate by reaction with additional alkali metal carbonate.

6. Apparatus for the production of alkali metals from the corresponding alkali metal aluminates, comprising a vertically disposed tubular reactor, a reaction container having a substantially open top and a perforated bottom, means supporting said container in an upright position in a zone in said reactor intermediate the upper and lower ends thereof, means for heating said reactor and its contents in said zone, means closing the upper end of said reactor with a gas tight seal, a product receiving chamber communicating with the lower end of said reactor and closing said lower end with a gas-tight seal, means for rapidly connecting said receiver to and disconnecting it from the lower end of said reactor, means for cooling said receiver and its contents, and means for sequentially evacuating and introducing an inert gas into said reactor and said receiver while connected in communication with each other.

7. Apparatus for the production of alkali metals from the corresponding alkali metal aluminates, comprising a vertically disposed tubular reactor, a reaction container having a substantially open top and a perforated bottom, means supporting said container in an upright position in a zone in said reactor intermediate the upper and lower ends thereof, there being substantial clearance around said reaction container between it and the inner surface of the reactor, means for heating said reactor and its contents in said zone, removable means closing the upper end of said reactor with a gas-tight seal, a product receiving chamber communicating with the lower end of said reactor and closing said lower end with a gas-tight seal, means for rapidly connecting said receiver to and disconnecting it from the lower end of said reactor, means for cooling said receiver and its contents, and means for sequentially evacuating and introducing an inert gas into said reactor and said receiver while connected in communication with each other.

8. Apparatus for the production of alkali metals from the corresponding alkali metal aluminates, comprising a vertically disposed tubular reactor, a reaction container having a substantially open top and a perforated bottom, means removably supporting said container in an upright position in a zone in said reactor intermediate the upper and lower ends thereof, there being substantial clearance around said reaction container between it and the inner surface of the reactor, means for heating said reactor and its contents in said zone, removable means closing the upper end of said reactor with a gas-tight seal, a product receiving chamber communicating with the lower end of said reactor and closing said lower end with a gas-tight seal, means for rapidly connecting said receiver to and disconnecting it from the lower end of said reactor, means for cooling said receiver and its contents, and means for sequentially evacuating and introducing an inert gas into said reactor and said receiver while connected in communication with each other, said means for heating said reactor and its contents in said zone including a wall structure surrounding said reactor in the region of said zone in closely spaced relationship therewith to define a closed gas chamber therebetween, means for applying heat to the outside of said wall structure, and means for maintaining a non-oxidizing gaseous atmosphere in said gas chamber about the exterior of said reactor.

9. A process for the production of an alkali metal which comprises introducing into the upper end of a heated reaction chamber a container charged with an intimate mixture of alkali metal aluminate and metallic aluminum, closing and evacuating the reaction chamber, introducing additional heat into said reaction chamber to heat the charge in said container to a reaction temperature range and cause the formation of alkali metal and alumina in said container while draining said alkali metal from the container to a product-receiving zone, cooling said product receiving zone, bleeding an inert gas into said reaction chamber, opening the upper end of said reaction chamber and quickly replacing said container with a freshly charged one while maintaining the temperature in said reaction chamber substantially up to said reaction range, closing said reaction chamber, evacuating it, and introducing additional heat therein for forming additional alkali metal and alumina.

References Cited in the file of this patent

UNITED STATES PATENTS

| 673,761 | Cowles | May 7, 1901 |
| 2,710,798 | Hansley | June 14, 1955 |

OTHER REFERENCES

Mellor: A Comprehensive Treatise of Inorganic and Theoretical Chemistry, vol. II, page 450. Published in 1922 by Longmans, Green and Co., London, England. On file in Division 59 of the Patent Office.